Nov. 28, 1950 E. E. CHICKERING 2,531,379
HARVESTER FOR ONIONS AND THE LIKE
Filed May 9, 1945 4 Sheets-Sheet 1

INVENTOR
EARNEST E. CHICKERING
BY
ATTORNEY

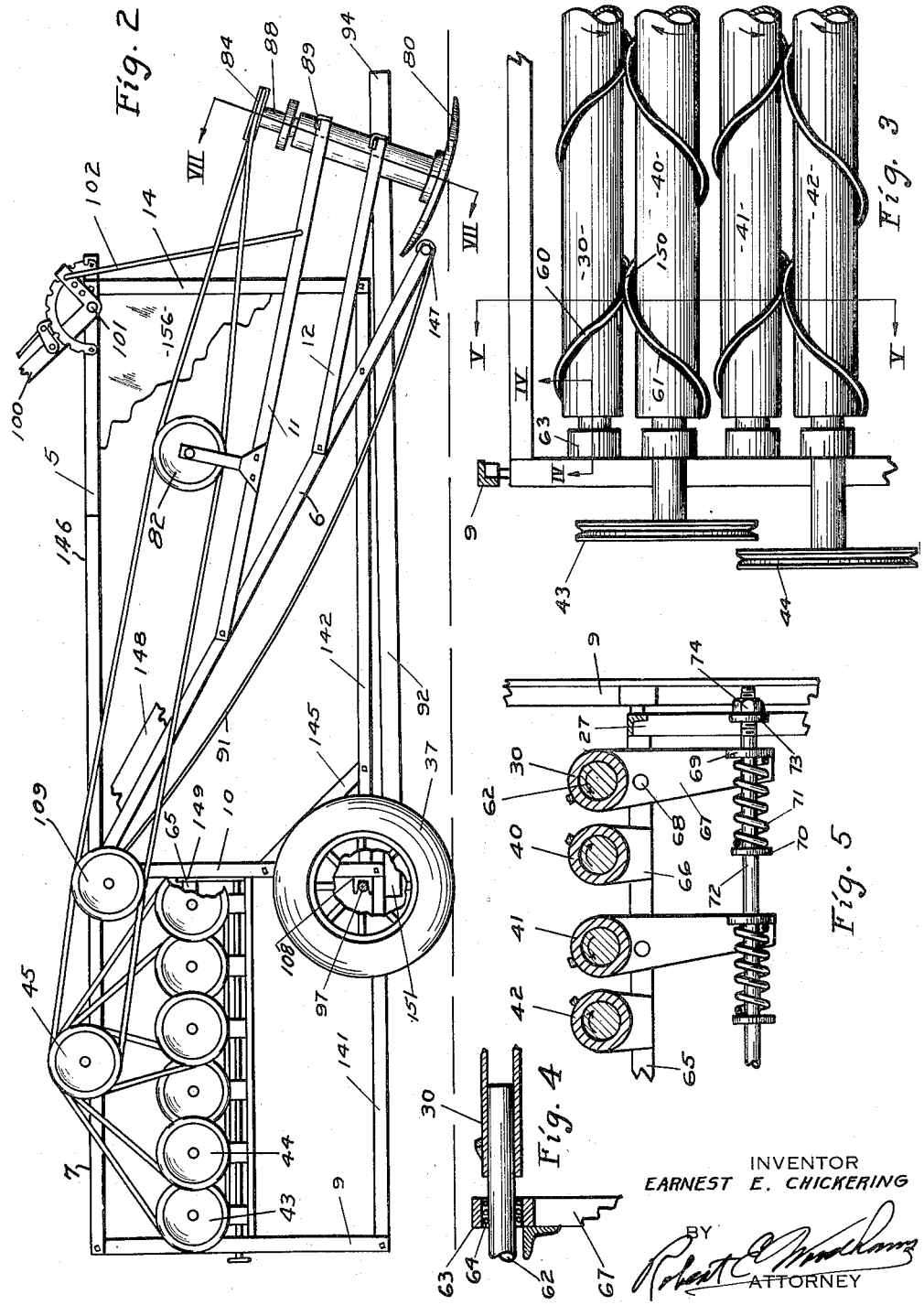

Nov. 28, 1950      E. E. CHICKERING      2,531,379
HARVESTER FOR ONIONS AND THE LIKE
Filed May 9, 1945      4 Sheets-Sheet 3
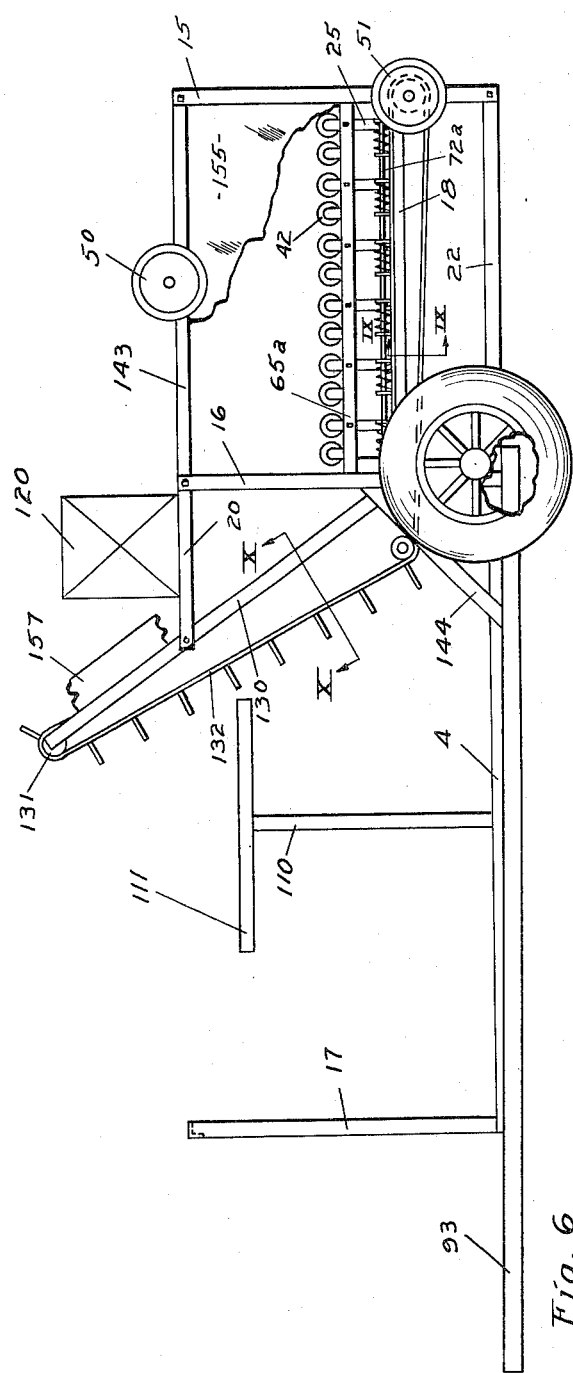
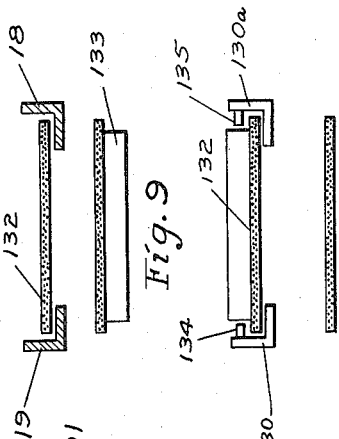
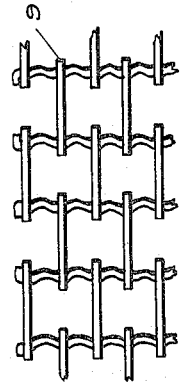
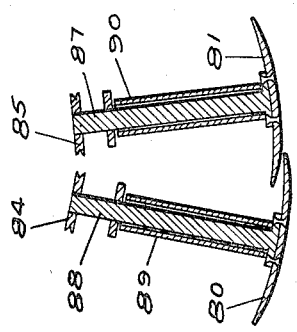
INVENTOR
*EARNEST E. CHICKERING*
BY
ATTORNEY Patented Nov. 28, 1950

2,531,379

UNITED STATES PATENT OFFICE 2,531,379

HARVESTER FOR ONIONS AND THE LIKE

Earnest E. Chickering, Belding, Mich.

Application May 9, 1945, Serial No. 592,775

4 Claims. (Cl. 55—9)

This invention relates to a harvester, and particularly to a type of harvester adapted for collecting, cleaning and delivering to bag-filling means carried thereon any of several types of agricultural products.

The problem of harvester a large number of agricultural products is at present largely concerned with picking them from at or near the surface of the ground, cleaning them, separating weeds and placing them in a suitable receptacle, such as a bag or crate. In the harvesting of crops whose desired part is in whole or in part below the surface of the ground, such as onions, carrots, beets and turnips, there is the necessity of first raising them entirely to the surface of the ground. This is now satisfactorily accomplished by various available machines, such as a small plow-like machine known as a "puller," the common potato digger and other similar pieces of equipment. In the harvesting of crops whose desired part is already above the surface of the ground, such as spinach, this step is not necessary, but in all of these cases hand labor is usually relied upon to lift the vegetable from the ground, remove the dirt, separate weeds, and place it in the bag or crate. Machines now available for this purpose are only partially satisfactory and hence have only a limited use.

It is particularly desirable in providing a machine for taking a root vegetable, such as those above named, from the surface of the ground, cleaning it, topping it and placing it in a sack, that the machine will scoop the vegetables from a rather wide and occasionally somewhat scattered windrow which the puller or digger sometimes leaves. Further, it is desirable that these means be capable, at the will of an operator, of scooping the vegetables from a short distance under the surface of the soil to handle those cases where the puller may have only partially lifted them. It is next desirable that means be provided which will remove from the vegetables a greater part of the dirt which normally clings to them when they are dug, and usually that the leafy tops be removed and discharged back to the ground while the root part is collected in bags. It will also be found that mechanical devices for picking these vegetables from the ground will also take up with them a large number of weeds. Means should therefore be provided to separate the weeds from the useful vegetable and return the weeds to the ground.

In picking up a leafy vegetable, such as spinach, the function of topping is not needed, but a machine will be useful which will cut the vegetable, shake out dirt, lift it from the ground and place it in a suitable receptacle.

In providing a mechanical device to accomplish these desired ends, I have had primarily in mind means for harvesting onions and the embodiment hereinafter described and illustrated by the accompanying drawings has been particularly designed for that purpose. However, it will be observed that it will also harvest a large variety of other similarly growing agricultural products without any, or at the most only slight, modification. Hereinafter, the discussion will, for purposes of illustration, be given in terms of handling onions, but it will be understood as for example only and not as indicating the entire scope of usefulness of my machine.

Accordingly, the principal purpose of my invention is to provide a device to lift agricultural products from at or near the surface of the ground and collect them in a container.

A further object of my invention is to provide a device of the type mentioned which, after the agricultural products are lifted from at or near the surface of the ground, will substantially remove clinging dirt from them.

A further object of my invention is to provide a device which will receive an agricultural product having a leafy top, such as an onion, and remove the top therefrom and do so without damaging the desirable part of the product.

A further object of my invention is to provide a harvesting machine for agricultural products which will effectively remove weeds therefrom.

A further object of my invention is to provide a harvesting machine for accomplishing the foregoing named purposes, which machine is relatively compact and convenient to move around a field.

A further object of my invention is to provide a harvesting machine for agricultural products capable of accomplishing the foregoing named purposes which can be easily handled by a light tractor.

A further object of my invention is to provide a harvesting machine capable of accomplishing the foregoing named purposes which is strong and sturdy, not readily subject to breakage or getting out of adjustment, but which can be easily repaired by ordinary tools and materials when and if such does occur.

Other objects and purposes of my invention will be apparent to those acquainted with equipment of this type upon reading the following description and examination of the accompanying drawings.

In the drawings:

Figure 2 is a somewhat schematic, partly broken view of the right hand side of my improved harvester, but showing only parts at or closely adjacent to said side.

Figure 3 is a fragmentary detail of the roller section of my improved harvester.

Figure 4 is a section taken on line IV—IV of Figure 3.

Figure 5 is a section taken on the line V—V of Figure 3.

Figure 6 is a somewhat schematic view of the left side of my improved harvester.

Figure 7 is a section taken on line VII—VII of Figure 2.

Figure 8 is a fragmentary detail view of the initial lifting conveyer.

Figure 9 is a section taken on line IX—IX of Figure 6.

Figure 10 is a section taken on line X—X of Figure 6.

Figure 1:
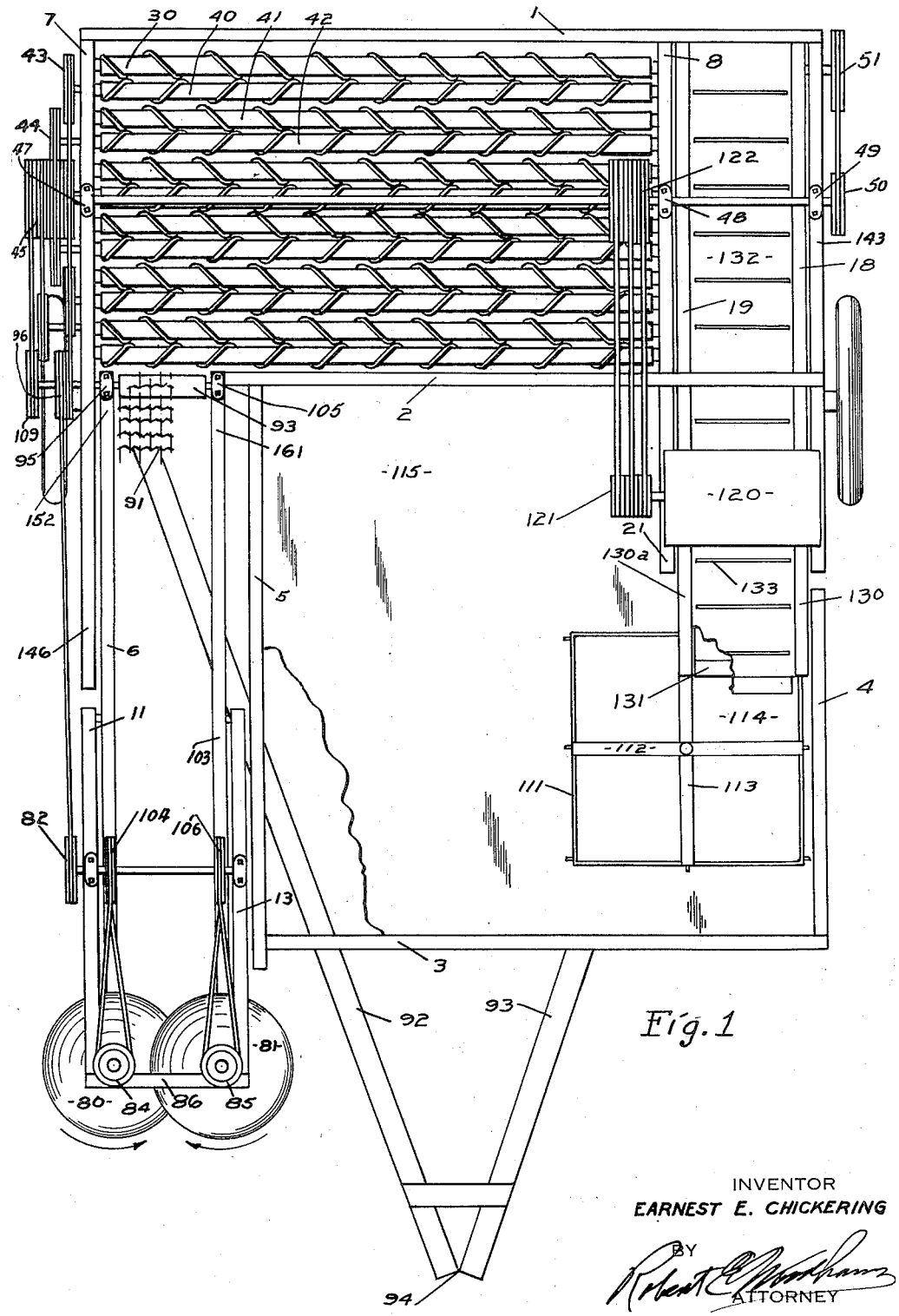
Figure 1 is a somewhat schematic, partially broken top view of my improved harvester.

Since my invention lies in certain improved details for a harvester as well as in the general arrangement of the parts, it is evident that the items comprising my invention might appear in several forms and combinations. It will also be observed that these parts may be modified quite freely to adapt a harvester for the handling of different kinds of agricultural products and for operating under varying conditions. However, for the purpose of illustrating my invention, I have chosen a particular embodiment thereof which is successful for harvesting onions and which will provide a clear example of my invention. Where certain parts are shown in the drawings schematically it shall be taken to mean that the individual parts concerned are themselves conventional, and where there is shown no specific means for fastening individual parts together, it shall likewise be taken to mean that these fastening means are conventional.

Looking now to Figure 1 the part thereof at the bottom of the drawing indicates the front of the harvester and the part at the top of the drawing indicates the rear. References herein to the "leftward" and "rightward" sides are taken from a forwardly facing position. The primary frame, or skeleton, of the harvester comprises a plurality of members preferably of angle iron material but which may be U-channels or box channels as required to secure necessary strength. A pair of laterally disposed top members 1 and 2 are connected by a longitudinal member 8. A longitudinal member 7 is welded or otherwise suitably fastened, to the rightward end of the frame member 1 and defines the upper rearward corner of the righthand side of my machine. A forward lateral member 3 defines the upper side of the forward part of the frame and its rightward end is connected to the rightward end of the lateral member 2 by a longitudinal frame member 5.

Figure 11:
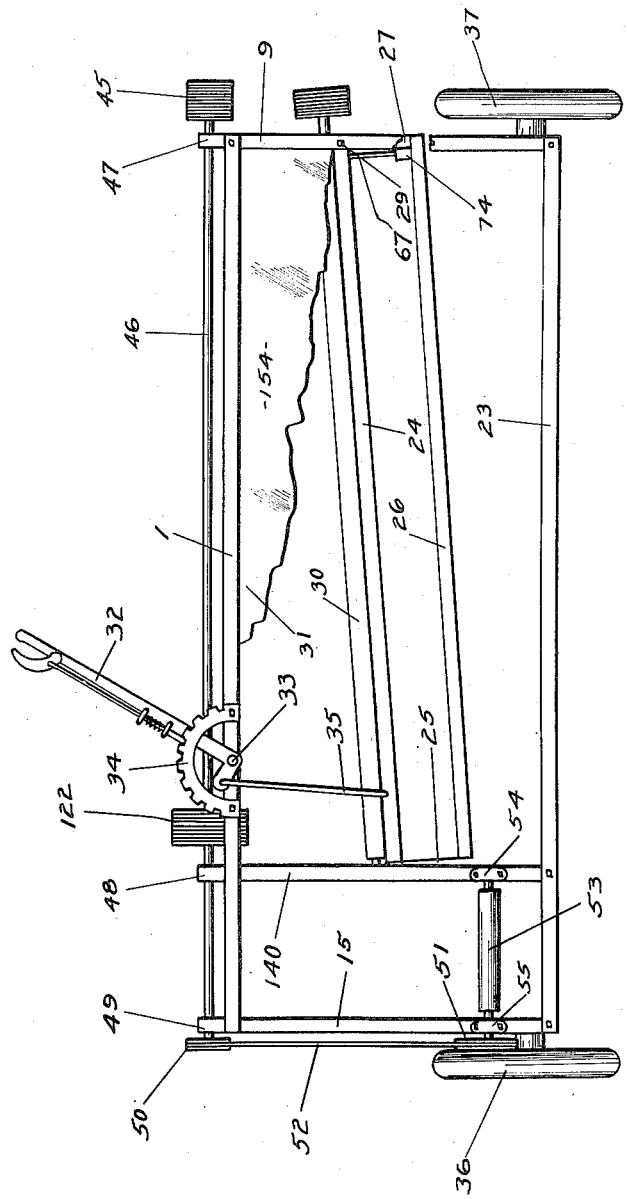
Figure 11 is a somewhat schematic partially broken view of the back end of my improved harvester.

Looking now at Figure 11 it will be seen that the rear of the frame is substantially rectangular and composed of frame members suitably fastened together indicated at 1, 15, 23 and 9. A vertical frame member 140 connects frame members 1 and 23 and is spaced from frame member 15 for purposes appearing hereinafter. The right rearward part of the frame (Figure 2) is composed of the top member 7 already mentioned, the rearward vertical member 9, a central vertical member 10 and lower longitudinal member 141. Associated with the longitudinal frame member 5 is the vertical frame member 14 and the horizontal longitudinal frame member 142. The lefthand side of the frame, or skeleton (Figure 6), consists of the vertical rearward frame member 15, intermediate vertical frame member 16 and a forward vertical frame member 17. These are connected by the upper horizontal member 143, a lower rearward horizontal member 22 and a forward horizontal member 4. A short longitudinal member 20 is supported at the upper end of the intermediate vertical member 16 and is provided for purposes appearing hereinafter. Angle braces 144 and 145 (Figures 6 and 2, respectively) are provided for supplemental support as needed. Other frame members may be supplied as needed to provide a strong and substantially rigid frame of the general shape and proportions here indicated and illustrated. Since these are all conventional and will be constructed according to known principles, they will be made to provide whatever strength and stiffness is desired and further description and illustration is not needed.

At the rightward side of my harvester is the pick-up mechanism which includes a pair of parallel members 6 and 103 which are suitably connected by end pieces (not shown) to form the rigid rectangular frame. These members 6 and 103 are pivoted at their upper ends 152 and 161, respectively, to adjacent portions of the basic frame namely, the vertical member 10 and a member parallel thereto (not shown) extending downward from the rightward end of the lateral frame member 2. From points near the forward end of the forwardly extending member 6 there extends in a substantially horizontal plane a pair of substantially parallel disk-supporting members 11 and 12. A similar pair of members, of which the numeral 13 indicates the upper one, likewise extends forwardly from the member 103. These are connected at their forward ends by the cross-bar 86 (Figure 1).

Held in a forwardly extending position by these substantially horizontal members and suitable cooperating cross-frame members, of which one is shown at 86, are the shaft supporting members 89 and 90 (Figures 2 and 7). These are supplied with suitable bearings which not only permit easy rotation of the shaft 87 and 88 but hold said shafts against downward movement with respect to said bearings.

At the lower ends of each of said shafts are the disks 80 and 81 which are of hardened steel, each comprises a segment of a sphere, preferably a hollow sphere, having a relatively long radius, and which are positioned to overlap each other as best shown in Figures 1 and 7. At the upper ends of each of said shafts are the drive pulleys 84 and 85. The shafts are held forwardly enough that the elements of the disks which are most forwardly, that is, which are parallel to the direction of movement of the harvester, are substantially parallel to the surface of the ground in order that the leading edges of the disks will tend to dig into the ground slightly and go under and lift up the vegetable being harvested.

At the ends of the pick-up frame, partly defined by the side members 6 and 103, are rollers 105 and 147 around which extends the flexible chain conveyer 91. A suitable side guide, as fragmentarily indicated at 148, should be supplied for each side of this conveyer section but these are conventional and do not require detailed description.

Turning now to the cleaning and topping mechanism, attention is invited to the rollers shown in the rearward portion of my machine. A suitable box-like frame section is provided for the adjustable support of the series of rollers.

The rearward part of this box section is shown in Figure 11 and the elements thereof are indicated by numerals 24, 25, 26 and 27. The right rearward corner of this box frame is pivotally mounted at 29 on the vertical member 9. Similar pivotal support is provided for the right forward corner 149 of this box frame (Figure 2).

The leftward end of this said box frame supporting the roller bed is vertically movable on the said pivoting supports. Suitable adjusting means for said roller bed should be supplied in any convenient form such as by the lever mechanism shown in Figure 11. Here an adjusting lever 32 is pivoted to the upper frame member 1 by suitable pivoting means 33 and cooperates with a fixed arcuate rack 34. A rod 35 connects a suitable portion of the operating lever 32 with one member, as the upper member 24, of the frame which supports the roller bed. Obviously, this lever may be placed in any convenient position and should be provided with suitable means for acting simultaneously on both the forward and rearward sides of the roller supporting frame.

Within this frame and on the upper members thereof are mounted the series of rollers of which the numerals 39 and 40 indicate one pair and the numerals 41 and 42 indicate another pair. As best shown in Figures 3, 4 and 5, these rollers each comprise a hollow tube into which there is inserted a stub shaft 62 held by a bearing housing 63 which is provided with a suitable bearing 64. Each of the roller tubes 39 and 40 are provided with a spiral beading 60 and 61, of which one is a righthand spiral and the other is a lefthand spiral. These spirals are of equal pitch so that when they contact each other at the point 150 they will contact each other at corresponding points throughout the full extent of each of said rollers. One of said rollers is driven by a drive pulley 43 and the other is mounted loosely to be driven rotatably by the contacting spiral of the driven roller. This causes a definite shearing action between the two beadings.

These rollers are mounted on suitable frame members of which one is indicated by numeral 65 in Figures 2 and 5. The non-adjustable rollers, as rollers 40 and 42, are mounted on any solid bearing support 66 which is in turn mounted on the frame member 65, in fixed relation thereto. The adjustable rollers, such as rollers 39 and 41 are mounted on a relatively long lever member 67 which is pivoted at point 68 intermediate of its ends to the supporting frame member 65. As shown the pulley driven roller is the non-adjustable one of each pair and the other is the adjustable one, but this may be reversed if desired by suitable adjustment of the drive belt tensioning to correspond thereto. A lug 69 extends from the lower end of the lever 67 and has an opening therein through which extends the adjusting rod 72. This rod has on it a collar 70 which backs a spring 71 surrounding said rod 72 and bearing against the lug 69. Said rod is guided through a lug 73 supported by a suitable vertical frame member such as the frame member 27. The said rod is threaded and provided with an adjustable nut 74 for holding said rod in any adjusted position. As said rod 72 is moved rightward as appearing in Figure 5, the spring 71 is compressed against the lug 69 and urges the adjustable roller 39 more tightly against the non-adjustable roller 40. In this way the pairs of rollers will always be held together with any desired degree of tension and yet the rollers can readily separate when a weed, stone or other obstruction gets between them. After the obstruction has passed through, the rollers will immediately return to their contacting position.

On the left side of my harvester I provide the bagging mechanism, which includes a conveyer belt 132 which runs horizontally across the leftward end of the roller bed and then turns upwardly to elevate the agricultural products for proper discharge into suitable collecting means, such as a bag or crate.

The frame members 18 and 19 support and guide the conveyer belt in the part of its travel across the end of the roller bed and the upwardly directed frame member 130 and 130a support and guide said conveyer belt in its upwardly traveling portion. It will be observed in Figure 10 that these latter frame members are supplied with the secondary guides 134 and 135 for holding the conveyer belt 132 against the supporting frame. At the rearward end of the conveyer belt 132 there is the supporting roller 53 mounted at each of its ends in suitable bearings 54 and 55 which in turn are supported by the vertical frame members 140 and 15, respectively. At the forward end of said conveyer belt there is the supporting and guiding roller 131 which is held in suitable bearings supported near the ends of the guide members 130 and 130a.

The said conveyer belt should be provided with the conventional blade elements 133 for holding the conveyed materials as they are carried up the relatively steep slope of the elevator.

There is conveniently provided a bag-holding member 111 which may be of any conventional type, but one preferred and convenient type is indicated in the drawings. It comprises the vertical supporting post 110 which is suitably mounted on the floor 115 and pivotally supports a pair of crossed members 112 and 113. These members cooperate with member 111 to form four openings of which one is indicated at 114. The members surrounding this opening may conveniently be provided with hooks for supporting a bag in position 114 below the end of the elevator. As one bag is filled the upper part of the bag-holding mechanism is rotated to move another bag into position and the filled one removed, tied and either placed in a suitable position on the platform or pushed off on the ground to await a pick-up wagon.

The entire harvester is supported by wheels 36 and 37 which are of any convenient and conventional size and form and which may be mounted onto the harvester in any convenient manner. One possible mounting method is indicated in Figure 2 wherein a U-channel 108 receives a suitable bearing for the supporting shaft 97.

Draw bars are provided by relatively long angularly positioned angle members 92 and 93. These are fastened by welding or bolting at their respectively rearwardly ends such as the end 151 to a somewhat central portion of the frame, such as that portion near or directly below the wheel bearings. They meet at their forward ends 94 to which may be attached any convenient tractor hitching device. In the designing of this type of harvester, care should be taken that the point 94 is laterally spaced from the disks 80 and 81 sufficiently that the righthand wheel of the tractor will be separated by a safe distance from the windrow of products which the disks are intended to pick up.

While it is not impossible to drive the various moving parts of my harvester by suitable means driven from either or both of the wheels 36 and 37, I have found it a substantial improvement over known types to provide other means to effect this driving. On the frame members 20 and 21 there is supported any suitable prime mover 120, such as a small gasoline engine. The prime mover 120 is provided with a take-off power pulley 121 which for the load intended to be driven may advantageously be a three-section V-belt pulley. A main shaft 46 (Figure 11) is supported by the bearings 47, 48 and 49 and mounts the power receiving pulley 122 and a pair of power take-off pulleys 45 and 50. Any suitable and conventional clutch may be used.

At the leftward side of the harvester the power take-off pulley 50 is connected by a suitable belt, preferably a V-belt, to the roller driving pulley 51. This drives the conveyer 132 at a speed in relation to the rest of the mechanism determined by the relative sizes of the pulleys 50 and 51.

At the rightward side of the harvester the power take-off pulley 45 has a plurality of sections for driving the various pulleys operating the directly driven rollers, and for operating the rest of the mechanism associated with the rightward side of the harvester. These driving pulleys are arranged in any convenient relationship to each other but are desirably staggered as indicated by the pulleys 43 and 44 to overlap each other somewhat in order to secure the better control and more positive drive incident to somewhat larger pulleys. The belting system is conveniently arranged so that there are four driving belts each engaging the main pulley 45 and two of the roller driving pulleys. A suitable belt from another section of the main pulley 45 drives the pulley 109 which in turn drives the roller 105 for moving the chain belt 91 as desired. Another pulley 98 mounted on the same shaft as pulley 109 drives the jack-pulley 82 which is mounted on a suitable jack shaft and thereby drives the pulleys 104 and 106. These last named pulleys in turn drive the pulleys 84 and 85 for rotating the pick-up disks 80 and 81.

The relative sizes of the various pulleys are adjusted to provide the relative speeds needed for the particular use to which the harvester is to be put and the conditions under which it will operate. For example, if the harvester is picking up onions which are covered by a heavy and rather clinging dirt or which are associated with a large number of weeds, then it may be desirable to run the pick-up disks 80 and 81 and the conveyer a little slowly with respect to the rollers of the roller bed. On the other hand if the onions are relatively clean and free from weeds the pick-up mechanism can run a little faster with respect to the roller bed inasmuch as the roller bed will have less cleaning and weed separating to do and will be able to use its entire area for topping. Ordinarily, however, a single speed setting will suffice, at least on a given field, since the pick-up speed can be varied by the speed of the pulling tractor.

Any suitable mechanism for vertically adjusting the frame members 6 and 103 of the pick-up conveyer may be used. By way of example there is shown a lever 100 pivotally mounted to the frame member 5 at 101, controlled by a fixed arcuate rack and connected by a rod 102 to the member 13 of the pick-up elevator.

Suitable side enclosing panels which are partially shown at the numerals 154 (Figure 11), 155 (Figure 6), 156 (Figure 2) may be provided for closing the sides of my harvester both to prevent spilling of the harvested items from the various parts thereof and to improve the appearance. Side guides, such as partially indicated at 157, should be provided for the bagging elevator. These, however, are all conventional constructions and since they form no part of my invention are not shown in detail.

Operation

With the various parts above described and illustrated in the drawings, assembled and functioning as above set forth, the harvester is drawn by any suitable draft means, such as a tractor, in a direction already indicated as forward. Continuing to assume that onions are the product being harvested, it is also assumed that a puller has preceeded this harvester along the row and the onions are lying in substantially straight windrows and that they are all at or at least very near the surface of the ground.

The pick-up elevator of the harvester is adjusted as shown in Figure 2 so that the forward portion of the disks is at or slightly under the surface of the ground. Ordinarily, in harvesting onions, the disks will be run slightly under the surface.

With the disks revolving as indicated by the arrows in Figure 1 the onions, together with associated dirt, weeds and grass, are picked up from the ground and delivered onto the conveyer belt 91. This belt, being of link construction and provided with relatively large openings, will roll and tumble the onions as they travel upward on it. This will shake a great part of the dirt through the belt and return it immediately to the ground. The onions, weeds and remaining dirt are delivered from the top of said belt onto the rightward end of the roller bed. With the roller bed adjusted for a small downward tilt to the left, the rollers are driven to rotate towards each other as indicated by the arrows in Figures 3 and 5. As above indicated the power is supplied to only one of these rollers and it drives the other by contact between the beadings on each of said rollers. This insures that these beadings will rub closely together with a shearing action.

As the onions are rolled and tumbled on this roller bed further dirt is cleaned from them and discharged through the roller bed onto the ground, weeds are quickly separated from the onions and passed through the rollers. The tops of the onions are also carried through the spaces between cooperating pairs of rollers by the mutual rotation thereof, but since the bulbous part of the onion will obviously not pass between said rollers, the onion with its top extending between the rollers will work downwardly along said rollers until the top encounters the meeting point of a pair of beadings, as at point 150 in Figure 3. Here the top will be quickly and neatly sheared off leaving the rest of the onion to roll on down the rollers and be discharged onto the horizontal part of the conveyer belt 132. It will be observed that I have at this point a distinct and definite advantage over previously known equipment of this type, in that, although the rollers alone may often remove the top of the onion, by the provision of the shearing action of the contacting beadings, I insure that the top will definitely be removed and I also eliminate the possibility that onions and their tops might jam between the rollers and obstruct the operation of the equipment.

As the onions are discharged from the leftward end of the roller bed, they fall onto the forwardly moving conveyer 132 and are carried to the top of the elevator portion thereof and dropped through the space 114 into a suitable bag being held by the above described members of the bag-holding means, or other suitable container.

When this harvester is used for harvesting a leafy vegetable, such as Swiss chard or spinach, the disks will act as cutters as well as pick-up agents, the conveyer will function as before, but the rollers will be removed or covered and a receiving crate placed at the upper end of the pick-up conveyer 91.

It will be evident that with the operators of this harvester standing on the platform 115, they can, by a minimum of movement, keep full watch over all parts of the equipment and quickly make whatever adjustments are necessary to meet varying conditions of ground or harvested products as they occur.

By arrangement of the described parts as shown around a central platform this control is facilitated, and also the entire machine is kept relatively compact and maneuverable. By providing an independent engine to drive the various moving parts of the harvester and requiring the tractor or other pulling means only to pull the harvester on freely moving wheels, I do not eliminate the expense of a heavy and powerful pulling tractor but avoid the inconvenience that results when such a machine is used in the relatively soft soil that often characterizes onion or vegetable ground.

Obviously, variations may be made in the details of my harvester, but since its principles are capable of rather wide application these variations will be within the scope of my invention excepting as the claims expressly provide otherwise.

I claim:

1. In a machine for picking up and processing objects lying at or near the surface of the ground, the combination: means moving said objects from their position on the ground onto a pick-up conveyer; said pick-up conveyer aligned longitudinally with the direction of operating movement of said machine receiving said objects and conveying them to a plurality of cleaning rollers; said plurality of cleaning rollers operating in pairs and arranged transversely with respect to the direction of operating movement of said machine receiving said objects, moving them axially along said rollers and discharging them onto an elevator conveyer; said elevator conveyor receiving said objects and moving them forwardly in the direction of operating movement of said machine and discharging them into a receptacle; said pick-up conveyer, rollers, and elevator conveyer moving said objects in a U-shaped path; and working space for an operator at least partly located between the arms of said U.

2. In a machine for picking up and processing objects lying at or near the surface of the ground, the combination: a pair of rotating disks lifting said objects from the ground and delivering them to a pick-up conveyer; said pick-up conveyer aligned longitudinally with the direction of operating movement of said machine receiving said objects and conveying them to a plurality of cleaning rollers; a plurality of cleaning rollers operating in pairs and arranged transversely with respect to the direction of operating movement of said machine receiving said objects, moving them axially of said rollers and discharging them onto an elevator conveyer; said elevator conveyer receiving said objects and moving them forwardly in the direction of operating movement of said machine and discharging them into a receptacle; said pick-up conveyer, rollers, and elevator conveyer moving said objects in a U-shaped path; and working space for an operator at least partly located between the arms of said U.

3. In a machine for picking up and processing objects lying at or near the surface of the ground, the combination: a pair of rotating disks lifting said objects from the ground and delivering them to a pick-up conveyer; said pick-up conveyer aligned longitudinally with the direction of operating movement of said machine receiving said objects and conveying them to a plurality of cleaning rollers; said plurality of cleaning rollers operating in pairs and arranged transversely with respect to the direction of operating movement of said machine receiving said objects, moving them axially along said rollers and discharging them onto an elevator conveyer; said elevator conveyer receiving said objects and moving them longitudinally of the direction of operating movement of said machine and discharging them into a receptacle; said pick-up conveyer, rollers, and elevator conveyer moving said objects in a U-shaped path; working space for an operator at least partly located between the arms of said U; a self-contained prime mover driving the aforesaid moving parts; and supporting wheels movable independently of other movable parts of said machine.

4. In a machine for picking up and processing objects lying at or near the surface of the ground, the combination: a pair of rotating disks lifting said objects from the ground and delivering them to a pick-up conveyer; said pick-up conveyer aligned longitudinally with the direction of operating movement of said machine receiving said objects and conveying them to a plurality of cleaning rollers; said plurality of cleaning rollers operating in pairs and arranged transversely with respect to the direction of operating movement of said machine and including one driving roller and one driven roller.

EARNEST E. CHICKERING.

REFERENCES CITED

The following references are of record in the file of this patent:

UNITED STATES PATENTS

| Number | Name | Date |
|---|---|---|
| 861,857 | Jansen | July 30, 1907 |
| 1,041,595 | Clemens | Oct. 15, 1912 |
| 1,081,201 | Blunck | Dec. 9, 1913 |
| 1,083,927 | Eversman | Jan. 13, 1914 |
| 1,124,059 | Piper | Jan. 5, 1915 |
| 1,445,449 | Ricks | Feb. 13, 1923 |
| 1,479,929 | Ricks | Jan. 8, 1924 |
| 1,671,263 | Zuckerman | May 29, 1928 |
| 1,873,352 | Smith | Aug. 23, 1932 |
| 2,422,524 | Braun | June 17, 1947 |

FOREIGN PATENTS

| Number | Country | Date |
|---|---|---|
| 23,311 | Denmark | July 29, 1918 |
| 74,699 | Austria | Sept. 25, 1918 |
| 38,533 | Denmark | Mar. 12, 1928 |
| 56,132 | Netherlands | Apr. 15, 1944 |